(12) United States Patent
Yonezawa et al.

(10) Patent No.: US 6,253,606 B1
(45) Date of Patent: Jul. 3, 2001

(54) THERMOSENSITIVE FLOW RATE SENSOR

(75) Inventors: Fumiyoshi Yonezawa; Tomoya Yamakawa; Shingo Hamada; Takeharu Oshima; Satoru Kotoh; Hiroyuki Uramachi; Hidehito Yamauchi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/188,375

(22) Filed: Nov. 10, 1998

(30) Foreign Application Priority Data

May 21, 1998 (JP) .................................. 10-140177

(51) Int. Cl.[7] ........................................... G01F 1/68
(52) U.S. Cl. ....................................... 73/204.26; 73/202.5
(58) Field of Search ........................... 73/861.22, 204.26, 73/204.21, 204.22, 202.5

(56) References Cited

U.S. PATENT DOCUMENTS

| | | | |
|---|---|---|---|
| 4,214,478 | * 7/1980 | Lauterbach | 73/204.26 |
| 4,304,130 | * 12/1981 | Peter et al. | 73/204.26 |
| 4,403,506 | * 9/1983 | Lauterbach | 73/204.26 |
| 4,624,138 | * 11/1986 | Ono et al. | 73/204.26 |
| 4,843,445 | * 6/1989 | Stemme | 73/204.26 |
| 4,843,882 | * 7/1989 | Ohta et al. | 73/204.26 |
| 4,986,122 | * 1/1991 | Gust | 73/204.26 |
| 5,086,650 | * 2/1992 | Harrington et al. | 73/204.26 |

FOREIGN PATENT DOCUMENTS

| | | |
|---|---|---|
| 1-185416 | 7/1989 | (JP) . |
| 6-265384 | 9/1994 | (JP) . |

* cited by examiner

*Primary Examiner*—Harshad Patel
(74) *Attorney, Agent, or Firm*—Sughrue, Mion, Zinn, Macpeak & Seas, PLLC

(57) ABSTRACT

A highly accurate thermosensitive flow rate sensor is able to reduce the detection error of a flow rate even in the case of a flow accompanied by considerable intake air pulsation in an automotive engine or the like. A flow rate detecting section disposed in a main pipe is equipped with a support member having a first guide surface and a second guide surface for guiding a fluid on opposite sides thereof, and a flow rate detection element provided on the second guide surface of the support member. The second guide surface of the support member, on which the flow rate detection element is mounted, extends longer than the first guide surface in the downstream direction.

12 Claims, 14 Drawing Sheets

—— FLOW RATE WAVEFORM Q1 IN FLOW RATE TEST APPARATUS

- - - - FLOW RATE WAVEFORM Q4 IN FLOW RATE SENSOR OF THE INVENTION

AIR

AIR

THERMOSENSITIVE FLOW RATE SENSOR

BACKGROUND OF THE INVENTION

1. Field of the Invention

The present invention relates to a flow rate sensor for detecting the flow rate (amount or velocity) of a fluid and, more particularly, to a thermosensitive flow rate sensor suited for detecting the amount of air flowing into an internal-combustion engine employed for an automobile or the like.

2. Description of the Related Art

Generally, in an electronically controlled fuel injection system in an automotive engine, it is necessary to accurately measure the amount of air introduced into an engine to control the air-fuel ratio of an air fuel mixture. For this reason, a thermosensitive flow rate sensor that provides a mass flow signal and minimizes a pressure loss at the same time has been frequently used as an air flow rate detector in recent years.

FIG. 24 is a front view showing a thermosensitive flow rate sensor, which has been disclosed in Japanese Unexamined Patent Publication (Laid-open) No. 6-265384, observed from the upstream side, and FIG. 25 is a sectional side view thereof. FIG. 26 shows the piping of an induction or intake system in an automotive engine to which the thermosensitive flow rate sensor has been attached.

Referring to FIG. 26, reference numeral 1 denotes a main pipe through which the air having passed through an air cleaner 15 incorporating an air cleaner element 16 flows, the main pipe 1 having a downstream end thereof connected to an engine (not shown) via an air intake duct 17. Installed inside the main pipe 1 is a flow rate detector 5 equipped with a flow rate detection element 4 composed of a temperature compensation resistor 9 for measuring the temperature of intake air and a heating resistor 10 which is adapted to be heated to a predetermined temperature. Thermosensitive resistors made of platinum or the like are used for the temperature compensation resistor 9 and the heating resistor 10. The flow rate detection element 4 is electrically connected to a control circuit 7 via a terminal 6. As shown in FIG. 26, the air flow that has passed through the air cleaner 15 flows into the main pipe 1. At that time, the amount of heat determined on the basis of the amount of the intake air is taken away from the heating resistor 10. This should naturally lower the temperature of the heating resistor 10, but the control circuit 7 controls the heating current supplied to the heating resistor 10 in order to maintain the temperature difference from the temperature of the intake air measured by the temperature compensation resistor 9 at a nearly constant level. This makes it possible to measure the amount of intake air from the value of the heating current supplied to the heating resistor 10.

In an automotive four-stroke cycle engine, however, the positive pressure occurring at the exhaust side at the time of a so-called "overlap" where both an intake valve and an exhaust valve are open causes the occurrence of a pulsed flow including a reverse flow to the intake side, depending on the construction of the induction pipe composed primarily of the main pipe 1 and the air intake duct 17, and/or depending on the degree of opening of a throttle valve that is adapted to be opened and closed according to the depression and release of an accelerator pedal. There has been a problem in that the foregoing flow rate detection element 4 does not have a function of detecting the direction of an air flow, leading to an increased flow rate detection error.

To solve such a problem, efforts have been made to develop a flow rate detection element capable of detecting the direction of flow of a fluid, as disclosed in Japanese Unexamined Patent Publication No. 1-185416. FIG. 27 shows the composition of the flow rate detection element 4, and FIG. 28 is a perspective view of a flow rate detecting section 5 in which the flow rate detection element 4 has been installed. FIG. 29 shows the configuration of a control circuit for detecting the flow rate and the direction of flow.

The flow rate detection element 4 uses a pair of heating resistors 10a, 10b, and a pair of temperature compensation resistors 9a, 9b. The heating resistors 10a, 10b and the temperature compensation resistors 9a, 9b composed of platinum thin films are formed on a plate-shaped substrate made of an electrically insulated material such as a ceramic, which has high heat conductivity, by means of sputtering and photoetching. The parts located on the intake upstream side will be denoted by a subscript "a" while the parts located on the intake downstream side will be denoted by a subscript "b". As shown in FIG. 29, the respective heating resistors 10a and 10b are set so that their temperature is set to a value higher than the temperature of the intake air by a predetermined value. The heating current is controlled by a differential amplifier 12 and a transistor 13 so that the resistance value Rh of the heating resistors 10a and 10b remains at a constant value regardless of the flow rate, thus making it possible to provide a voltage value matched to the amount of intake air under the action of reference resistors 11a and 11b. In general, the thermal equilibrium between the heating resistors 10a, 10b and a fluid is given by the following formula:

$$Q = h \cdot S \cdot \Delta T$$

where Q: Amount of heat radiated from heating resistors
h: Heat conductivity
S: Surface area of heating resistors
$\Delta T$: Temperature difference between heating resistors and fluid In the case of a flow in the forward direction, if the flow rate is constant, then the heat conductivity h1 of the heating resistor 10a located on the upstream side becomes larger than the heat conductivity h2 of the heating resistor 10b located on the downstream side. Hence, the output Va of the reference resistor 11a becomes larger than the output Vb of the reference resistor 11b. In the case of a flow in the reverse direction, the aspect of the heat transfer is reversed from that of the forward direction; hence, h1<h2 results, and the outputs of the reference resistors become Va<Vb. Accordingly, both the output voltages Va and Vb are turned into a differential output by using a comparator 14 thereby to enable the detection of the flow rate and the direction of flow.

This type of thermosensitive flow rate sensor, however, is not yet satisfactory for detecting the flow rate of a pulsating intake flow. For instance, especially at the time of deceleration of a large pulsating flow not accompanied by a reverse flow, a local reverse vortex is generated around the flow rate detection element 4, and the flow rate detection element 4 undesirably detects this local reverse flow. This has been posing a problem of deteriorated accuracy in detecting the amount of air flow passing through the main pipe 1.

SUMMARY OF THE INVENTION

Accordingly, the present invention has been made with a view toward solving the problems described above, and it is an object thereof to provide a thermosensitive flow rate sensor capable of detecting the flow rate of a fluid with high accuracy even in a pulsating flow.

Bearing the above object in mind, according to one aspect of the present invention, there is provided a thermosensitive flow rate sensor for measuring the flow rate of a fluid passing through a main pipe based on a heat transfer to the fluid from a heating element of a flow rate detecting section installed in the main pipe, the flow rate detecting means comprising:

a support member having first and second guide surfaces formed on opposite sides thereof for guiding the fluid therealong; and a flow rate detection element provided on the second guide surface of the support member;

wherein the second guide surface of the support member on which the flow rate detection element is provided is formed by extending it longer than the first guide surface in a downstream direction.

In a form of the invention, the support member has a downstream-side end surface at which the first and second guide surfaces join to each other, the downstream-side end surface being formed to have a concave surface.

In another form of the invention, the support member has a downstream-side end surface at which the first and second guide surfaces join to each other, the downstream-side end surface being formed to have a convex surface.

In a further form of the invention, the second guide surface of the support member has a downstream-side end portion provided with a concave slope.

In a still further form of the invention, portions at which the first and second guide surfaces and the downstream-side end surface of the support member join to each other are round.

In a yet further form of the invention, the flow rate detection element is in the form of a plate which is installed on the second guide surface of the support member so that it is substantially parallel to a central axis of the main pipe extending in the direction of flow of the fluid therein.

In a further form of the invention, the second guide surface of the support member has an acceleration area disposed at a predetermined angle with respect to a central axis of the main pipe extending in the direction of flow of the fluid therein, the flow rate detection element being installed in the acceleration area formed in the second guide surface of the support member.

In a further form of the invention, the acceleration area formed in the second guide surface of the support member is a flat surface or a convex surface.

In a further form of the invention, the second guide surface of the support member has a surface disposed substantially in parallel to the central axis the main pipe on the downstream side of the acceleration area.

In a further form of the invention, the acceleration area formed on the second guide surface of the support member is a surface inclined at approximately ten degrees or less with respect to the central axis of the main pipe.

In a further form of the invention, the upstream portion of the support member has a streamline shape.

In a further form of the invention, the support member has an upstream portion formed to be symmetrical with respect to the central axis of the main pipe.

In a further form of the invention, the support member has an upstream-side distal end formed in a pointed manner.

In a further form of the invention, a measuring pipe is installed in the main pipe substantially in parallel to the direction of flow of the fluid, and the flow rate detecting means is disposed in the measuring pipe.

According to another aspect of the present invention, there is provided a thermosensitive flow rate sensor for measuring the flow rate of a fluid passing through a main pipe based on a heat transfer to the fluid from a heating element of a flow rate detecting means installed in the main pipe, the flow rate detecting means comprising:

a support member having a surface for guiding the fluid therealong, a flow rate detection element provided on the guide surface of the support member for detecting the flow rate of the fluid; and a restraining portion provided on a downstream side of the support member for restraining occurrence of a vortex.

The above and other objects, features and advantages of the present invention will become apparent from the following detailed description of preferred embodiments of the invention while taken in conjunction with the accompanying drawings.

DESCRIPTION OF THE PREFERRED EMBODIMENTS

The preferred embodiments of the present invention will now be described in conjunction with the accompanying drawings.

First Embodiment

Figure 1:
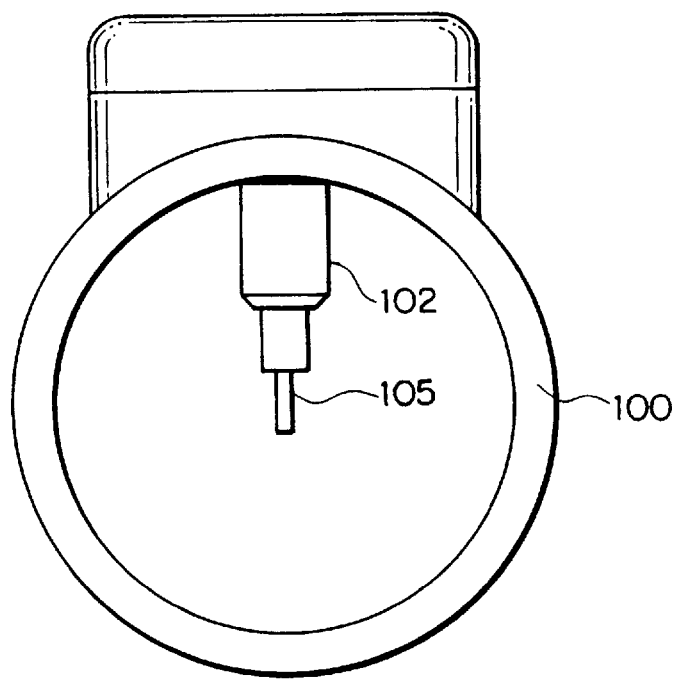
FIG. 1 is a view showing a thermosensitive flow rate sensor, as observed from the upstream side, in accordance with a first embodiment of the present invention.
Figure 2:
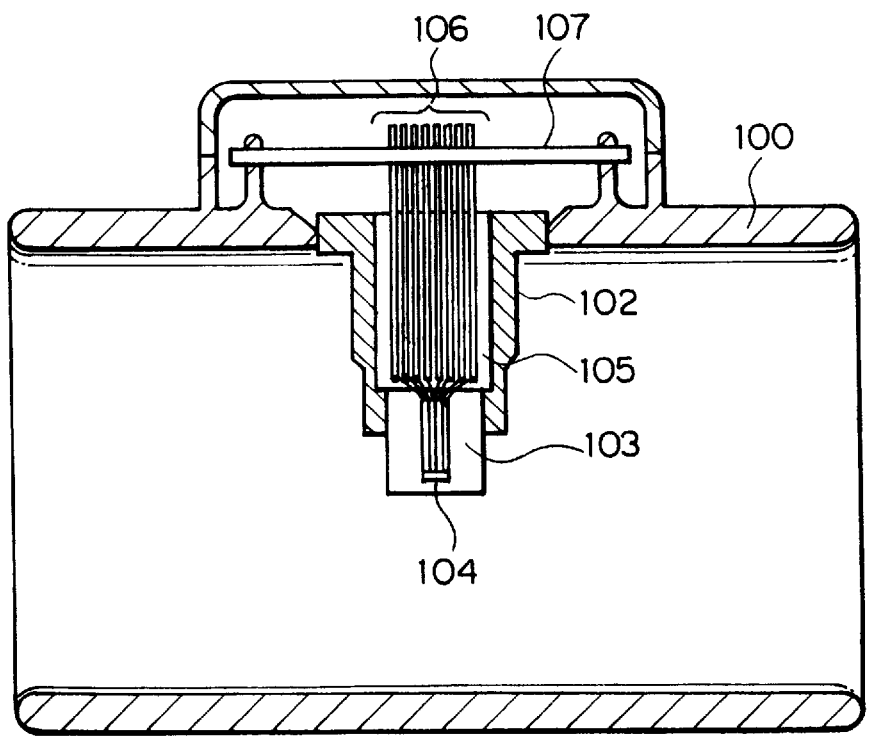
FIG. 2 is a sectional view of the thermosensitive flow rate sensor of the first embodiment of the present invention.
Figure 3:
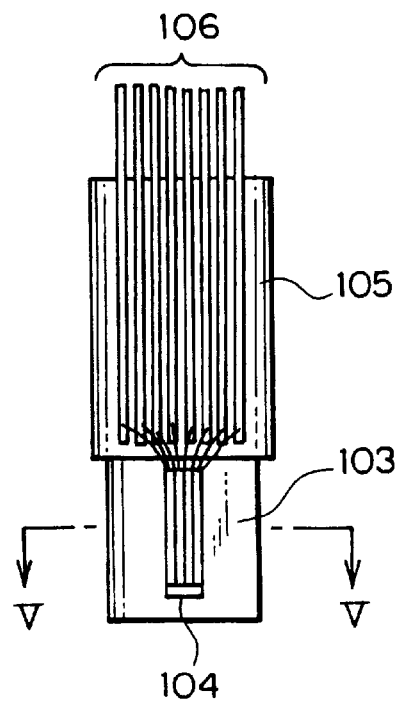
FIG. 3 is a schematic diagram showing a flow rate detecting section of the thermosensitive flow rate sensor of the first embodiment of the present invention.
Figure 4:
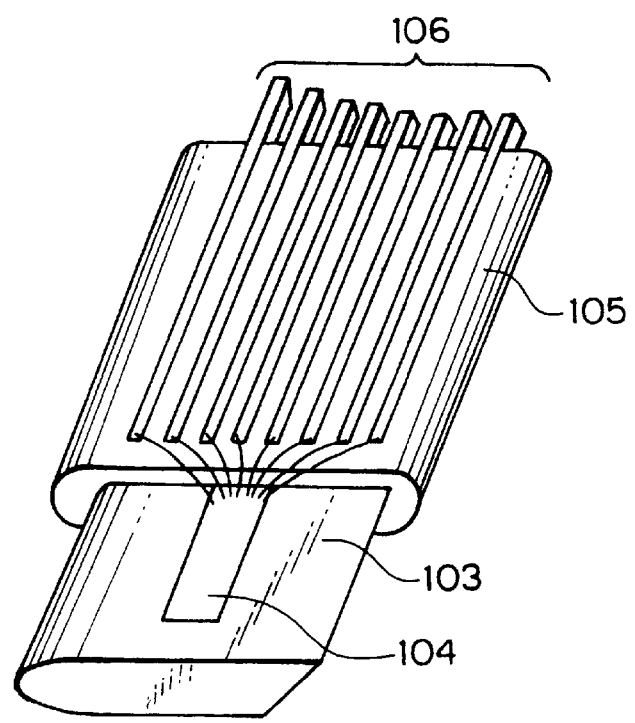
FIG. 4 is a perspective view of the flow rate detecting section shown in FIG. 3.
Figure 5:
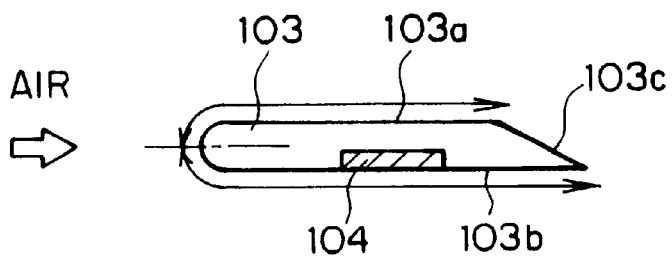
FIG. 5 is a sectional view taken at the line V—V of FIG. 3.

FIG. 1 is a schematic diagram showing a thermosensitive flow rate sensor in accordance with a first embodiment of the present invention, the view being observed from the upstream side; FIG. 2 is a sectional view of FIG. 1; FIG. 3 is a schematic diagram showing a flow rate detecting means in the form of a flow rate detecting section; FIG. 4 is a perspective view of FIG. 3; and FIG. 5 is a sectional view taken at line V—V of FIG. 3.

Figure 29:
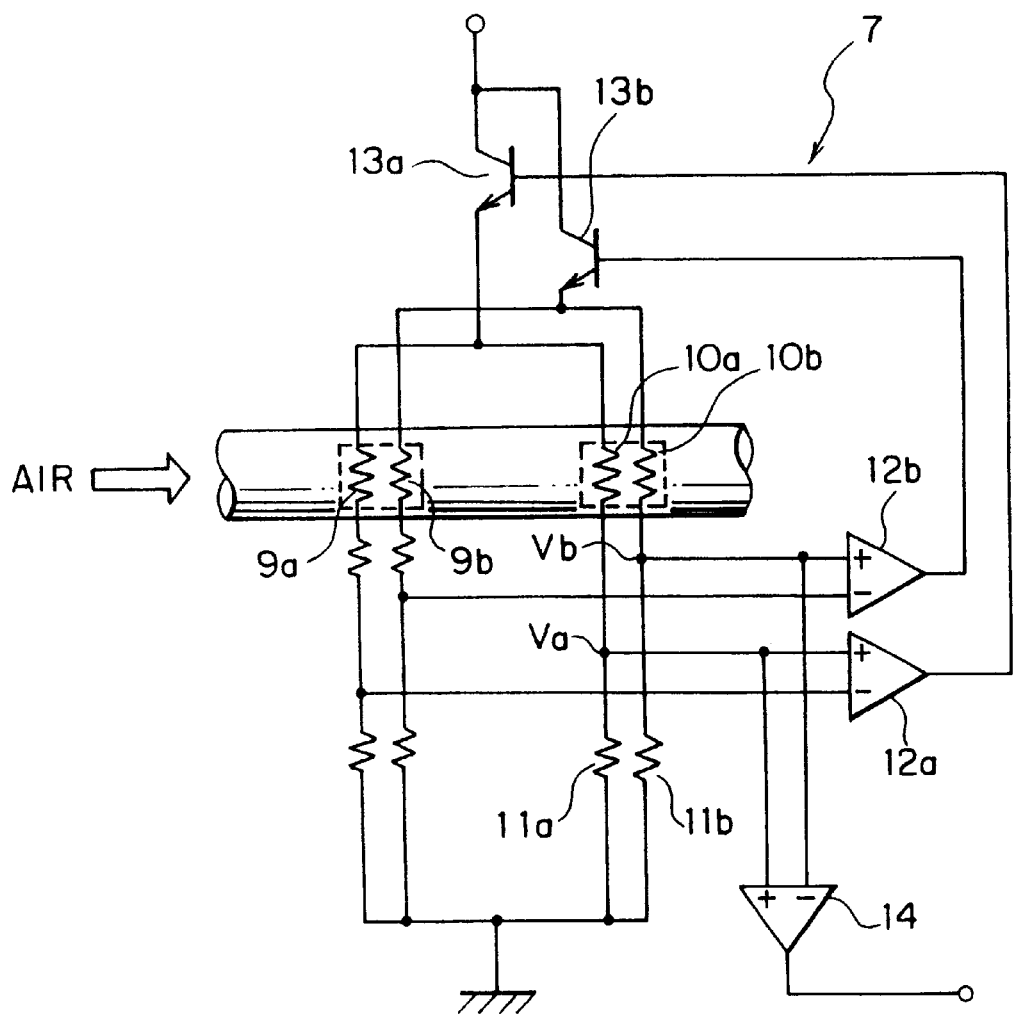
FIG. 29 is a circuit diagram of a control circuit for detecting the direction of a flow.

Referring to these drawings, a flow rate detecting section 105 is equipped with a support member 103 that has a first guide surface 103a and a second guide surface 103b. Installed in the second guide surface 103b is a flow rate detection element 104 on which a heating resistor and a temperature compensation resistor are formed. The first guide surface 103a and the second guide surface 103b function to guide an air flow, which has been introduced in a main pipe 100, along the surface of the support member 103 without causing the air flow to be significantly detached or burbled therefrom. The first guide surface 103a and the second guide surface 103b are joined at a downstream-side end surface 103c of the support member 103. The first and second guide surfaces 103a and 103b and the downstream-side end surface 103c are specifically defined as follows: when light is projected from the upstream side of intake air, the downstream-side end surface 103c is a shadowed portion, excluding the surface parallel to the projecting direction of light, and the portions excluding the downstream-side end surface 103c provide the first and second guide surface 103a and the second guide surface 103b is the uppermost stream portion of the support ;member 103 where arrows meet as shown in FIG. 5. In the first embodiment, the second guide surface 103b of the support member 103 extends more in the downstream direction than the first guide surface 103a. The flow rate detecting section 105 is inserted in a support 102, and the flow rate detection element 104 of the flow rate detecting section 105 is electrically connected to a control circuit 107 via a terminal 106 which is partly buried in the main body of the flow rate detecting section 105. The control circuit 107 has the same configuration as the control circuit 7 shown in FIG. 29.

Figure 6:
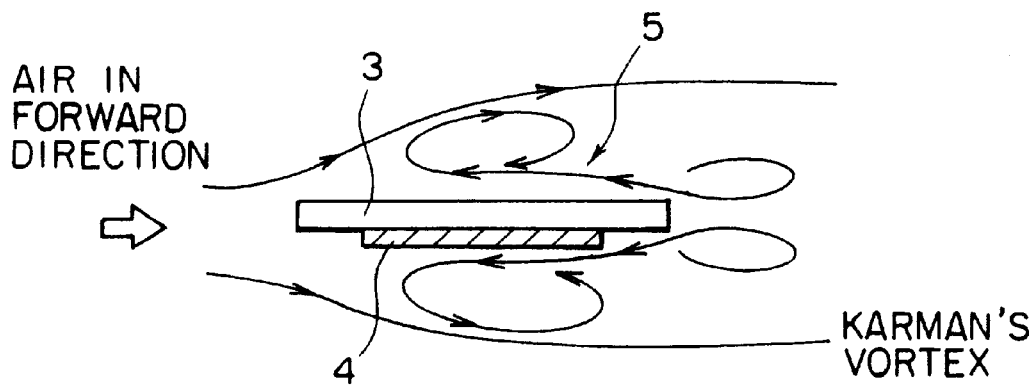
FIG. 6 is a schematic diagram showing the condition of a transitional flow in a conventional flow rate detecting section.

The conventional flow rate detecting section 4 is provided in such a manner that it projects from the surface of the support member 3 and the downstream end of the support member 3 is formed substantially at right angles to both side surfaces thereof as shown in FIG. 6. Therefore, at the time of deceleration when a large pulsating flow not accompanied by a reverse flow is running in the main pipe, a Karman's vortex generated in the backwash of the support member 3 causes the flow in the opposite direction to reach the surface of the flow rate detection element 4. The flow in the opposite direction is amplified into a larger vortex by the flow on the upstream side, causing a local reverse flow to occur on the surface of the flow rate detection element 4.

Figure 8:
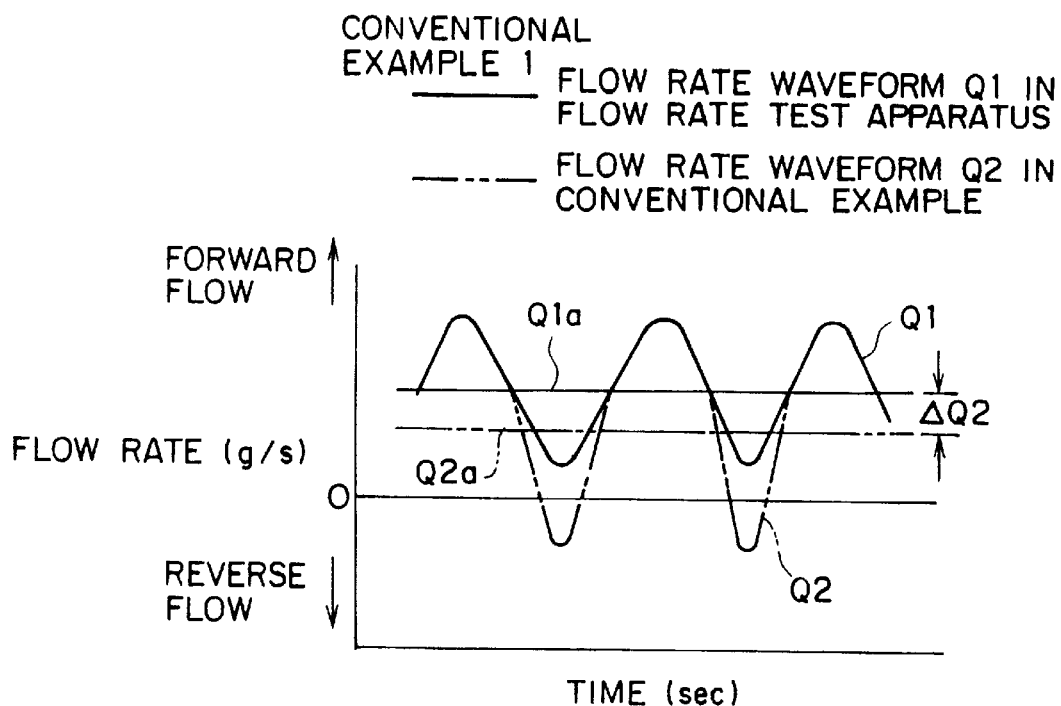
FIG. 8 is a diagram illustrative of the detection accuracy when a conventional flow rate detection element capable of detecting the direction of flow is employed.
Figure 28:
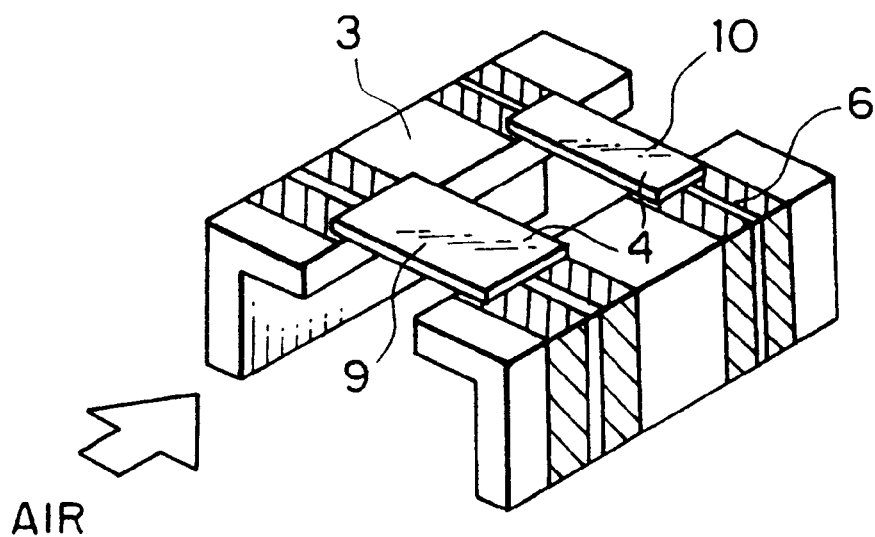
FIG. 28 is a perspective view of a flow rate detecting section for detecting the direction of a flow.

The flow rate sensor determines the flow rate in the main pipe based on the flow rate measured by the flow rate detection element 4. Therefore, when the conventional flow rate detection element 4 shown in FIG. 28 that is capable, for example, of detecting the direction of a flow is used, the accuracy of detecting the flow rate of the air passing through the main pipe inevitably deteriorates as indicated by the two-dot chain line as shown in FIG. 8. More specifically, a flow rate waveform Q1 indicated by the solid line in FIG. 8 in a flow rate test apparatus increases in the reverse direction, i.e. one direction, at the troughs as indicated by two-dot chain line Q2. Hence, in the conventional example, the mean value Q2a of the flow rate waveform Q2 decreases by ΔQ2 in comparison with the mean value Q1a of the flow rate waveform Q1. The flow rate test apparatus is an apparatus for detecting, by a different method, the flow rate of the air flowing through the main pipe; it may employ a hot-wire air flow sensor or a hot-wire probe.

Figure 9:
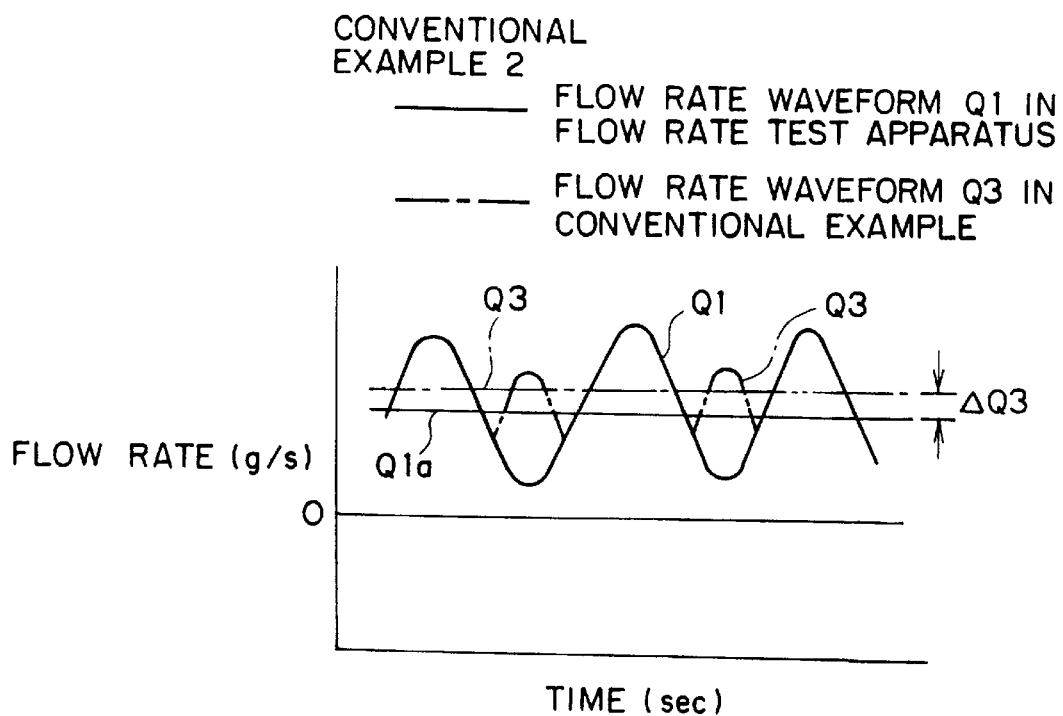
FIG. 9 is a diagram illustrative of the detection accuracy when another conventional flow rate detection element incapable of detecting the direction of flow is employed.
Figure 25:
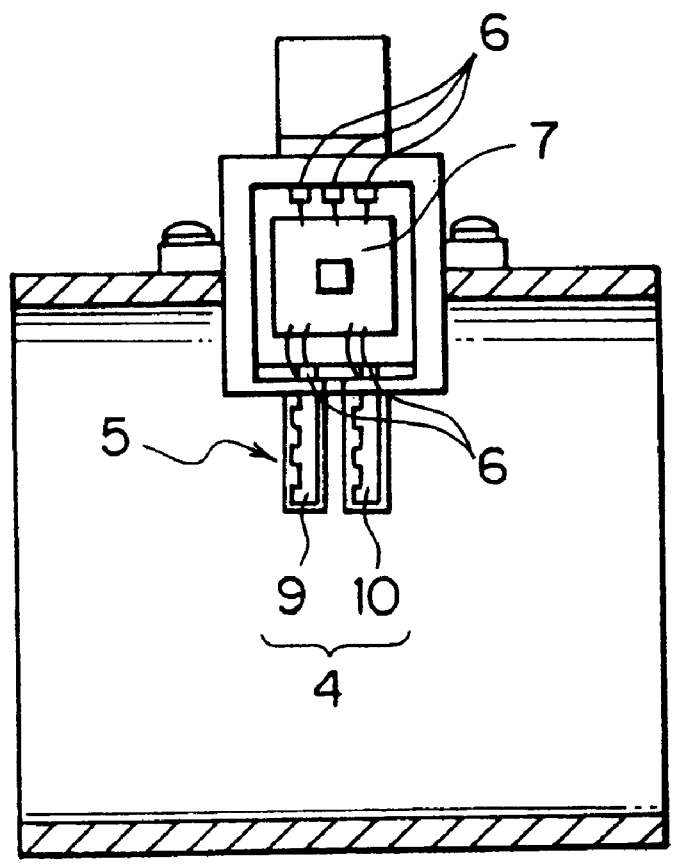
FIG. 25 is a sectional view of the conventional thermosensitive flow rate sensor of FIG. 24.
Figure 26:
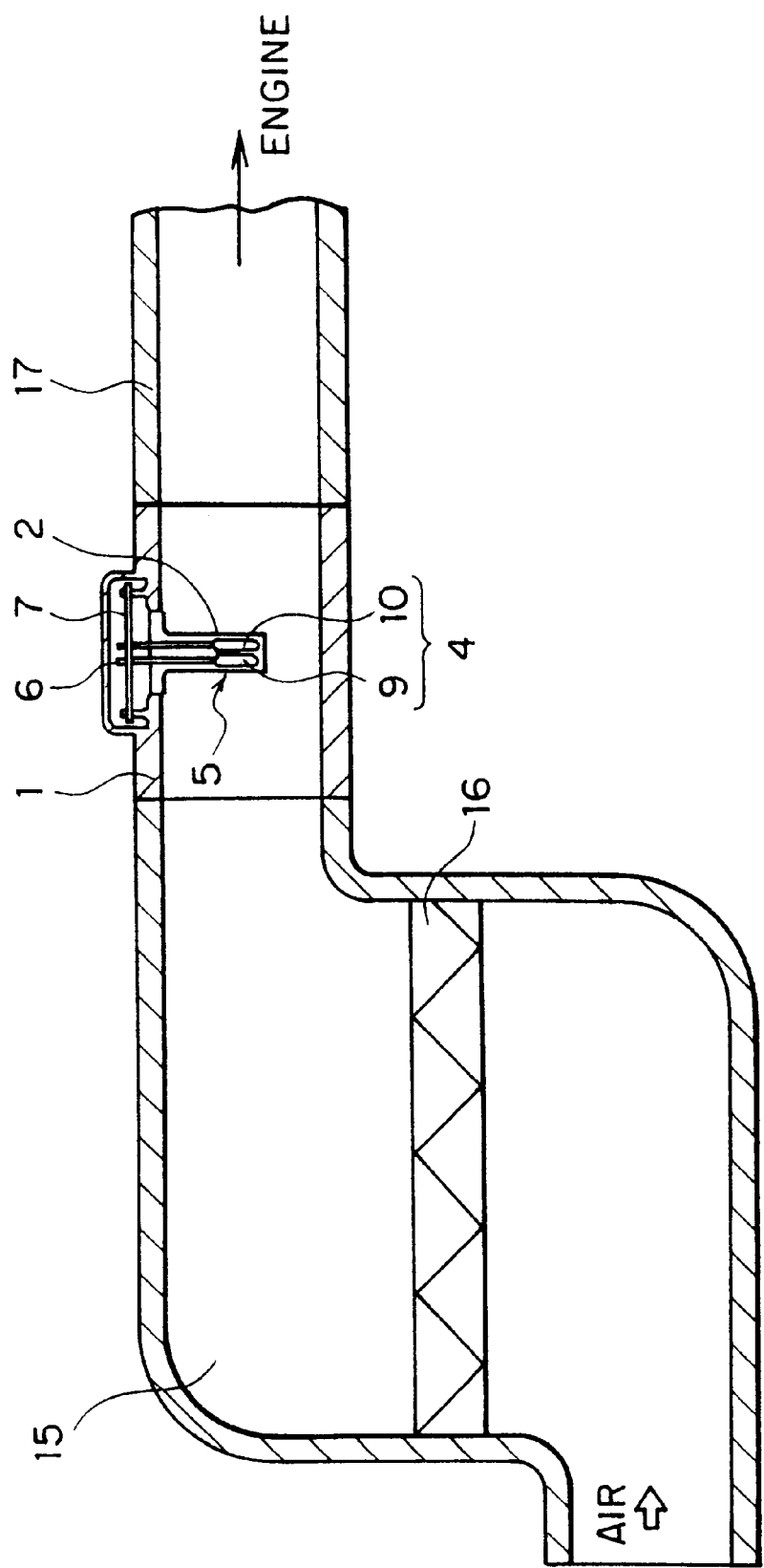
FIG. 26 is a piping diagram of an induction system of an automotive engine.
Figure 27:
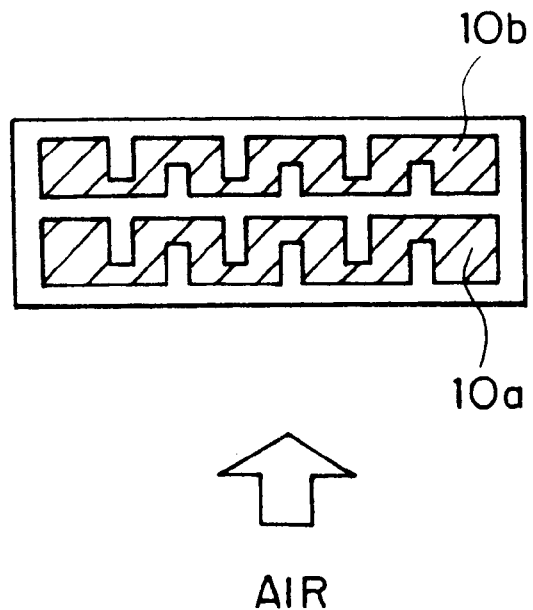
FIG. 27 is a block diagram of a heating resistor for detecting the direction of a flow.

When the conventional flow rate detection element 4 shown in FIG. 25 that is incapable of detecting the direction of a flow is used, the accuracy of detecting the flow rate of the air passing through the main pipe also deteriorates as indicated in FIG. 9. More specifically, the flow rate detection element 4 undesirably detects only the flow rate of the local reverse flow on the surface thereof. As a result, the flow rate waveform Q1 indicated by the solid line in FIG. 9 in the flow rate test apparatus increases in the positive direction by the flow rate of the reverse flow at the troughs as indicated by chain line Q3. Therefore, in the conventional example, the mean value Q3a of the flow rate waveform Q3 increases by ΔQ3 in comparison with the mean value Q1a of the flow rate waveform Q1.

Figure 7:
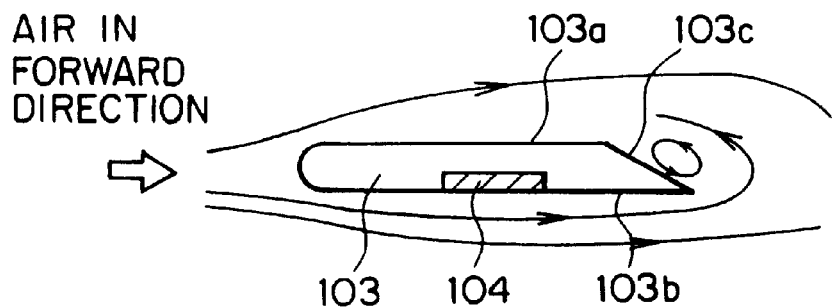
FIG. 7 is a schematic diagram showing the condition of a transitional flow in the flow rate detecting section of the first embodiment of the present invention.
Figure 10:
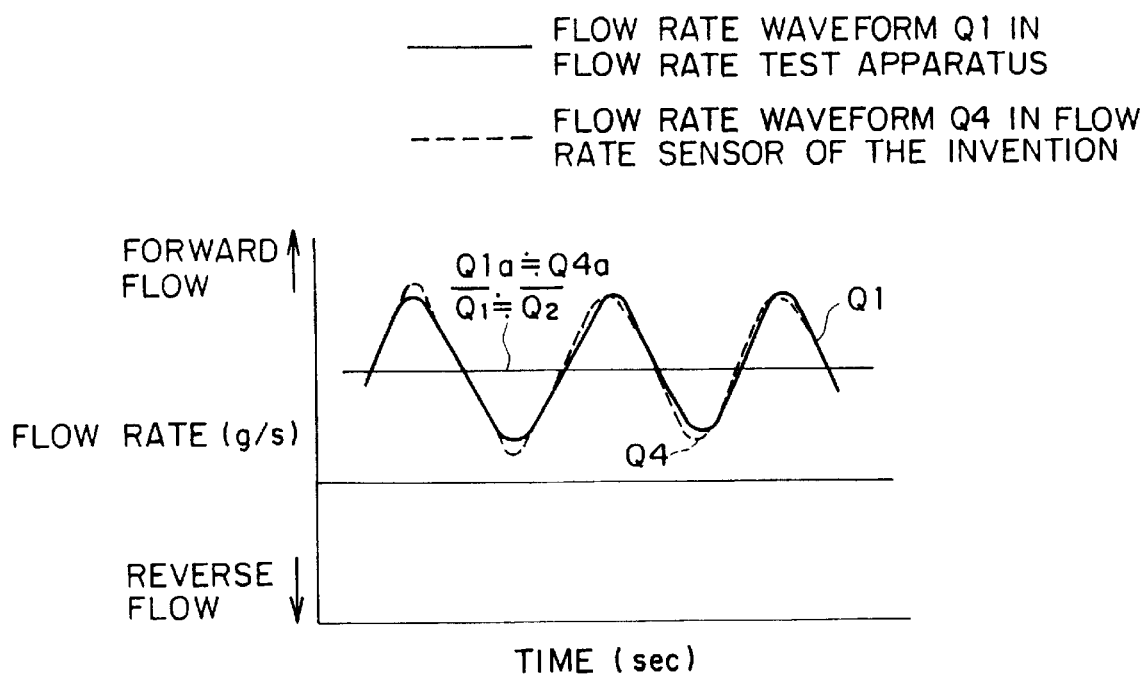
FIG. 10 is a diagram illustrative of the detection accuracy when the flow rate detecting section of the first embodiment of the present invention is employed.

In the flow rate detecting section 105 of the first embodiment, however, the flow rate detection element 104 is buried or embedded in the support member 103, and the second guide surface 103b is formed as a smooth flat surface with no projection. Furthermore, the downstream end of the support member 103 is formed so that it inclines toward the first guide surface 103a from the second guide surface 103b where the flow rate detection element 104 is disposed. Therefore, as illustrated in FIG. 7, at the time of deceleration when a pulsating flow not accompanied by a reverse flow is running through the main pipe 100, the Karman's vortex produced in the backwash of the first guide surface 103a and the second guide surface 103b of the support member 103 collapses, and the disturbed backwash flows into a pressure drop area formed at the downstream-side end surface 103c of the support member 103. This makes it possible to restrain the occurrence of the local vortex on the surface of the flow rate detecting section 105. As a result, the flow rate waveform Q1 in the flow rate test apparatus is hardly disturbed by the reverse flow or the like even at its troughs as indicated by dashed line curve Q4 in FIG. 10; hence, the mean value Q4a of a flow rate waveform Q4 in the flow rate sensor in accordance with the present invention is approximately equal to the mean value Q1a of the flow rate waveform Q1. This enables high detection accuracy of the flow rate of the air passing through the main pipe 100 to be secured.

Thus, the thermosensitive flow rate sensor in accordance with the first embodiment provides the outstanding advantage set forth below. In the conventional thermosensitive flow rate sensor wherein the flow rate detecting section 5 comprising the afore-mentioned plate-shaped flow rate detection element 4 mounted on a side surface of the support member 3 is provided in the main pipe as shown in FIG. 6, when measuring a large pulsating flow from the forward direction that is not accompanied by a reverse flow, the flow in the opposite direction based on a Karman's vortex generated in the backwash of the support member 3 reaches the surface of the flow rate detection element 4 especially upon deceleration, and this flow grows into a larger vortex due to the upstream flow, producing a local reverse flow on the surface of the flow rate detection element 4. This causes the deterioration in the detection accuracy of the flow rate of the air flowing into the main pipe.

In the case of the flow rate detecting section 105 in accordance with the first embodiment, upon deceleration during the time when such a pulsating flow is running, the Karman's vortex is collapsed at the downstream-side end surface 103c at which one guide surface where the flow rate detection element 104 is mounted, namely, the second guide surface 103b, and the other guide surface, namely, the first guide surface 103a join to each other. In addition, the air flow moving to a pressure-reduced portion of the downstream-side end surface 103c makes it possible to restrain the occurrence of a vortex on the surface of the flow rate detection element 104. Moreover, the second guide surface 103b on which the flow rate detection element 104 is mounted —is formed such that it extends in the rearward direction longer than the counterpart first guide surface 103a, thus rendering the static, pressure at the second guide surface 103b higher than the static pressure at the first guide surface 103a. This means that a velocity boundary layer that develops in the downstream direction from the second guide surface 103b on which the flow rate detection element 104 is installed becomes thinner (i.e., the velocity boundary layer is a thin fluid layer, the velocity of which rapidly changes from a zero flow velocity at the surface of the second guide surface 103b to the velocity of a uniform flow, i.e. the main flow, and it is distanced sufficiently away from the surface). Accordingly, the flow velocity increases in the vicinity of the surface of the flow rate detection element 104, leading to improved heat conductivity from the flow rate detection element 104 to a fluid. As a result, higher sensitivity and stable output of the flow rate detection element 104 can be achieved even when the flow rate varies.

Second Embodiment

Figure 11:
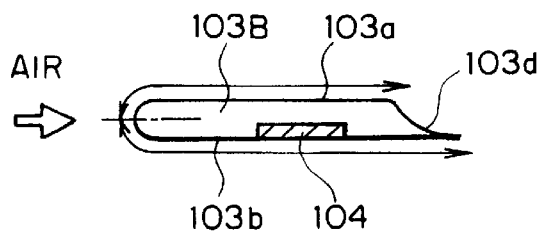
FIG. 11 is a sectional view which is similar to that of FIG. 5 and which shows a flow rate detecting section in accordance with a second embodiment of the present invention.

FIG. 11 shows a thermosensitive flow rate sensor in accordance with a second embodiment of the present invention; it is the same sectional view as that of FIG. 5. The second embodiment has the same construction as the first embodiment except for a support member 103B.

In the second embodiment, a downstream-side end surface 103d joining a first guide surface 103a and a second guide surface 103b of the support member 103B is formed so that it has a concave surface to increase the pressure-reduced area generated at the downstream-side end surface 103d. Thus, it is possible to further enhance the inflow of the backwash generated by the collapsed Karman's vortex described in the first embodiment, permitting a more stable flow on the surface of the flow rate detection element 104 at the time of deceleration when a transitional air flow not accompanied by a reverse flow is generated.

Third Embodiment

Figure 12:
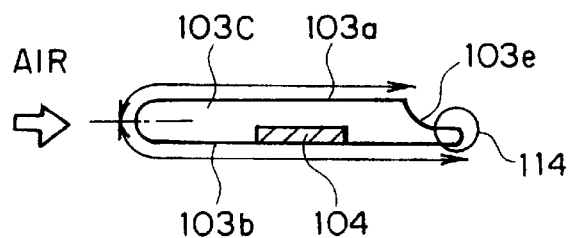
FIG. 12 is a sectional view which is similar to that of FIG. 5 and which shows a flow rate detecting section in accordance with a third embodiment of the present invention.

FIG. 12 shows a thermosensitive flow rate sensor in accordance with a third embodiment of the present invention; it is the same sectional view as that of FIG. 5. The third embodiment has the same construction as the first embodiment except for a support member 103C.

In the third embodiment, a downstream-side end surface 103e of the support member 103C has a concave surface and has a round portion 114 formed at the place where it is joined with a second guide surface 103b. Thus, the third embodiment is expected to provide the same advantage as that of the second embodiment and it also permits improved moldability when forming the support member 103C by means of injection molding with resin or the like since it has no sharp edge.

Fourth Embodiment

Figure 13:
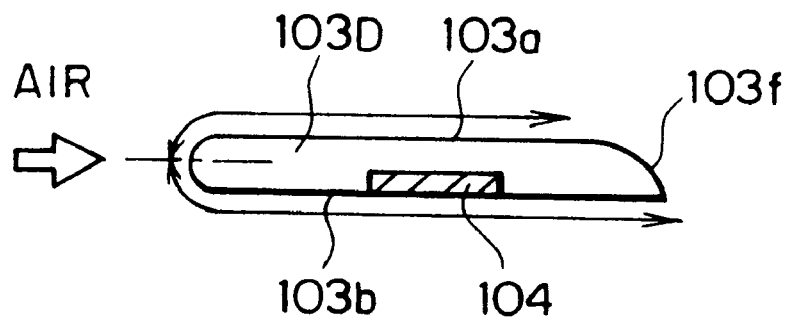
FIG. 13 is a sectional view which is similar to that of FIG. 5 and which shows a flow rate detecting section of a fourth embodiment in accordance with the present invention.

FIG. 13 shows a thermosensitive flow rate sensor in accordance with a fourth embodiment of the present invention; it is the same sectional view as that of FIG. 5. The fourth embodiment has the same construction as the first embodiment except for a support member 103D.

In the fourth embodiment, the downstream-side end surface 103f joining a first guide surface 103a and a second guide surface 103b of the support member 103D is formed to have a convex surface. This allows an air flow to be guided along the downstream-side end surface 103f even at the time of a reverse flow, so that the air flow on the second guide surface 103b can be stabilized by controlling the detachment separation of the air flow on the second guide surface 103b on which the flow rate detection element 104 is mounted thereby to control the ventilation resistance.

In addition, the fourth embodiment permits improved moldability when making it by means of injection molding with resin or the like.

Fifth Embodiment

Figure 14:
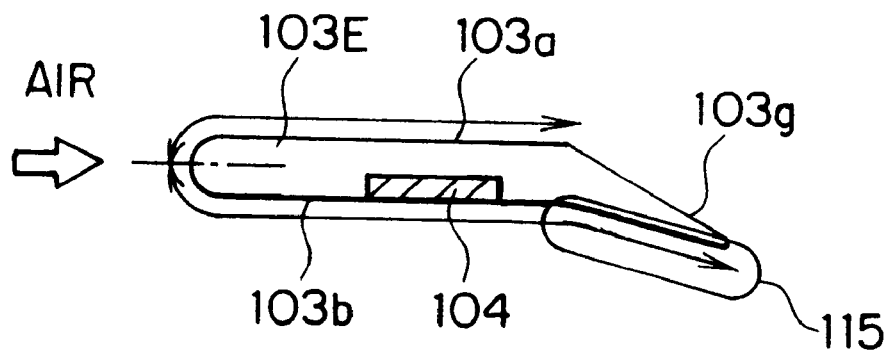
FIG. 14 is a sectional view which is similar to that of FIG. 5 and which shows a flow rate detecting section in accordance with a fifth embodiment of the present invention.

FIG. 14 shows a thermosensitive flow rate sensor in accordance with a fifth embodiment of the present invention; it is the same sectional view as that of FIG. 5. The fifth embodiment has the same construction as the first embodiment except for a support member 103E.

In a support member 103E of the fifth embodiment, the downstream portion of a second guide surface 103b on which a flow rate detection element 104 is attached has a downward slope 115, and a downstream-side end surface 103g is tapered downward from a first guide surface 103a toward a second guide surface 103b. This makes it possible to keep a detaching or separating vortex, which is generated in the backwash of the first guide surface 103a and the second guide surface 103b, from the flow rate detection element 104 and also makes it possible to block the flow in the reverse direction produced by the detaching vortex at the time of the transitional flow deceleration as described above. Thus, the occurrence of the vortex on the surface on the flow rate detection element 104 can be restrained.

Sixth Embodiment

Figure 15:
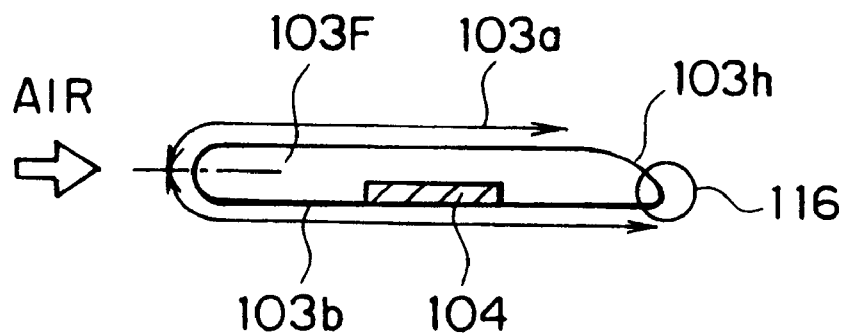
FIG. 15 is a sectional view which is similar to that of FIG. 5 and which shows a flow rate detecting section in accordance with a sixth embodiment of the present invention.

FIG. 15 shows a thermosensitive flow rate sensor in accordance with a sixth embodiment of the present invention; it is the same sectional view as that of FIG. 5. The sixth embodiment has the same construction as the first embodiment except for a support member 103F.

In the sixth embodiment, the support member 103F of a flow rate detecting section 105 has a round portion 116 formed at the place where a second guide surface 103b is joined with a downstream-side end surface 103h. Thus, the sixth embodiment is expected to provide the same advantage as that of the fourth embodiment and it also permits improved moldability when forming the support member 103 by use of injection molding with resin or the like since it has no edge.

Seventh Embodiment

Figure 16:
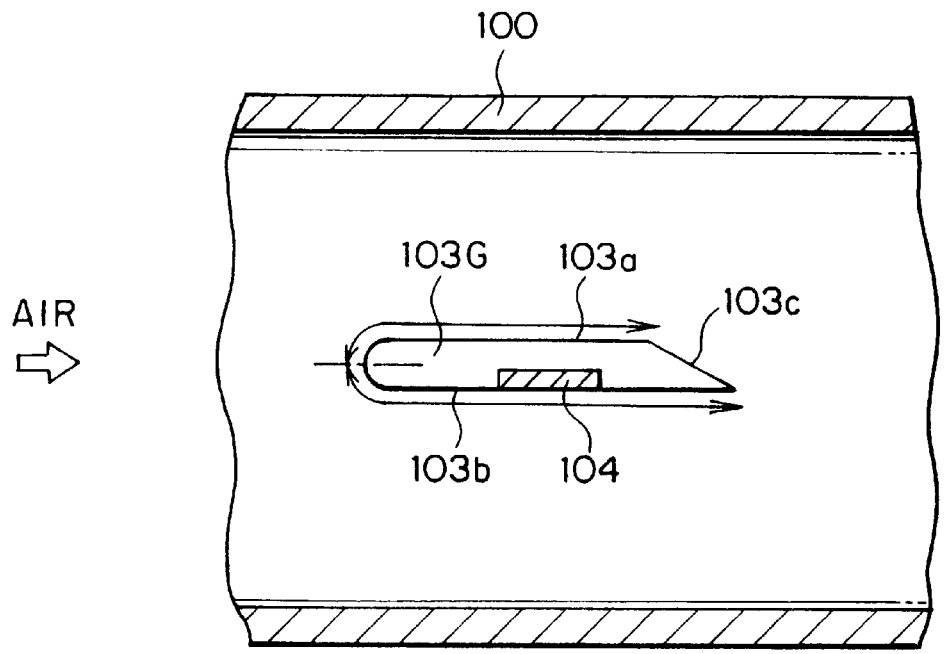
FIG. 16 is a sectional view which is similar to that of FIG. 5 and which shows a flow rate detecting section in accordance with a seventh embodiment of the present invention.

FIG. 16 is a partly sectioned view showing a thermosensitive flow rate sensor in accordance with a seventh embodiment of the present invention. In the seventh embodiment, a flow rate detection element 104 disposed on a second guide surface 103b of a support member 103G is parallel to a central axis O of a main pipe 100 in the direction of flow of the air therein, i.e. the central axis line of the main pipe 100. An air flow introduced into the main pipe 100 runs along a first guide surface 103a and the second guide surface 103b of the support member 103G. Therefore, even if suspended dust or the like that has passed through an air cleaner element (not shown) of an air cleaner disposed on the upstream side of the main pipe 100 enters the main pipe 100, it is possible to restrain contaminants such as dust from directly clinging to the flow rate detection element 104.

Thus, in a flow rate detecting section 105 of the seventh embodiment, an intake air flow moves along the second guide surface 103b of the support member 103G, on which the flow rate detection element 104 is mounted, since the flow rate detection element 104 is disposed substantially parallel to the central axis O in the direction of flow of the air in the main pipe 100. This prevents contaminants such as dust from clinging to the surface of the flow rate detection element 104, thus ensuring high accuracy of flow rate detection and reliability of the flow rate detection element 104.

Eighth Embodiment

Figure 17:
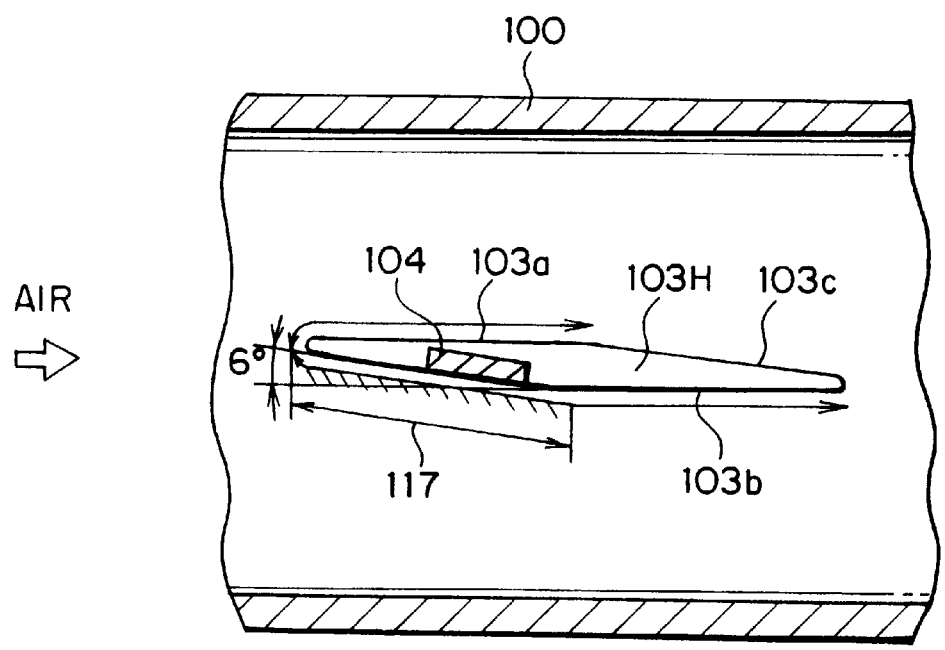
FIG. 17 is a sectional view which is similar to that of FIG. 5 and which shows a flow rate detecting section in accordance with an eighth embodiment of the present invention.

FIG. 17 is a partly sectioned view of thermosensitive flow rate sensor in accordance with an eighth embodiment of the present invention. In the eighth embodiment, a support member 103H is formed to have a flat, nearly rhombic-shaped section having the height decreasing from the midpoint toward opposite ends thereof. Also, a second guide surface 103b of the support member 103H in which a flow rate detection element 104 is buried or embedded is inclined approximately 6 degrees with respect to the central axis of a main pipe 100 in the direction of flow of the air therein, i.e., the central axis line of the main pipe 100. This configuration causes the intake passage formed between the second guide surface 103b and the inner surface of the main pipe 100 to be gradually narrowed so as to create an acceleration area 117 (the hatched area shown in FIG. 17) where an intake air introduced into the main pipe 100 is accelerated. Formed on the downstream side of the acceleration area 117 is a surface substantially parallel to the central axis O of the main pipe 100 in the direction of flow of the air therein, i.e., the central axis line of the main pipe 100. The flow rate detection element 104 is installed in the acceleration area 117 where it detects the flow rate of the air flowing through the main pipe 100. Thus, in the case of a flow in the forward direction, the air flow introduced into the main pipe 100 gradually gathers its velocity in the acceleration area 117. Therefore, the detachment of the flow around the flow rate detection element 104 can be restrained, and the same advantage as that of the first embodiment can be obtained also in the case of the foregoing transitional flow, enabling the occurrence of a vortex around the flow rate detection element 104 to be restrained. In the case of a flow in the reverse direction, the acceleration area 117 turns into a deceleration area; the small slope angle of the acceleration area 117 makes it possible to control the detachment of the flow in the opposite direction, so that the performance for detecting the flow in the opposite direction is not deteriorated.

As the slope angle of the acceleration area 117 increases, the effect for restraining the detachment of a flow around the flow rate detection element 104 in the case of the flow in the forward direction is enhanced, while on the other hand, the possibility of detachment of the flow in the reverse direction around the flow rate detection element 104 increases. Accordingly, it is preferable to set the slope angle of the acceleration area 117 to ten degrees or less as in the case of the spread angle for creating flows that do not detach in a diffuser or an expanding pipe.

Thus, according to the eighth embodiment, the flow rate detection element 104 is installed in the acceleration area 117 of the second guide surface 103b of the support member 103H in the flow rate detecting section 105. This restrains the flow around the flow rate detection element 104 from detaching and also improves the heat transfer from the flow rate detection element 104 to a fluid, permitting higher sensitivity and stable output of the flow rate detection element 104 to be achieved even when the flow rate varies.

Further, the surface parallel to the central axis O the main pipe 100 in the direction of flow of the air therein is formed on the downstream side of the acceleration area 117 of the second guide surface 103b of the support member 103H in the flow rate detecting section 105; hence, the detachment of the air flow after having passed through the acceleration area 117 can be restrained, thus enabling a flow on the surface of the flow rate detection element 104 to be stabilized.

Ninth Embodiment

Figure 18:
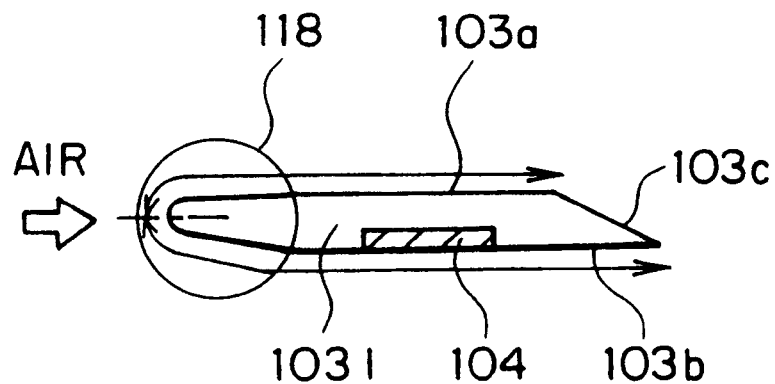
FIG. 18 is a sectional view which is similar to that of FIG. 5 and which shows a flow rate detecting section in accordance with a ninth embodiment of the present invention.

FIG. 18 shows a thermosensitive flow rate sensor in accordance with a ninth embodiment of the present invention; it is the same sectional view as that of FIG. 5. The ninth embodiment has the same construction as the first embodiment except for a support member 103I.

In the ninth embodiment, a distal end portion 118 on the upstream side of the support member 103I is formed to have a streamline shape. This reduces the drag coefficient at the support member 103I and the ventilation resistance in the main pipe 100 is controlled, leading to a reduced pressure loss. In addition, the velocity boundary layer that develops from the front edges of a first guide surface 103a and a second guide surface 103b becomes thinner; hence, the heat transfer from a flow rate detection element 104 embedded in the second guide surface 103b to a fluid is improved, allowing higher sensitivity and stable output of the flow rate detection element 104 to be achieved even when the flow rate varies.

Tenth Embodiment

Figure 19:
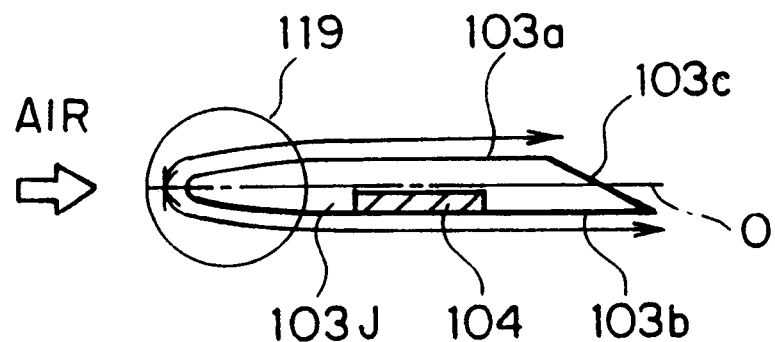
FIG. 19 is a sectional view which is similar to that of FIG. 5 and which shows a flow rate detecting section in accordance with a tenth embodiment of the present invention.

FIG. 19 shows a thermosensitive flow rate sensor in accordance with a tenth embodiment of the present invention; it is the same sectional view as that of FIG. 5. The tenth embodiment has the same construction as the first embodiment except for a support member 103J.

In the tenth embodiment, a distal end portion 119 of the support member 103J is formed so that it is symmetrically shaped with respect to a central axis O of a main pipe extending in the direction of flow of the air therein. The symmetrically shaped distal end permits uniform form drag or profile resistance in the vicinity of the leading edges of a first guide surface 103a and a second guide surface 103b of the support member 103J. This makes it possible to reduce the directivity of a flow in which a slight difference in the flow velocity distribution of intake air creates a tendency of the intake air to flow more easily along one of the first guide surface 103a and the second guide surface 103b than the other, enabling intake air to be stably guided around a flow rate detection element 104 and providing high accuracy of flow rate detection.

Eleventh Embodiment

Figure 20:
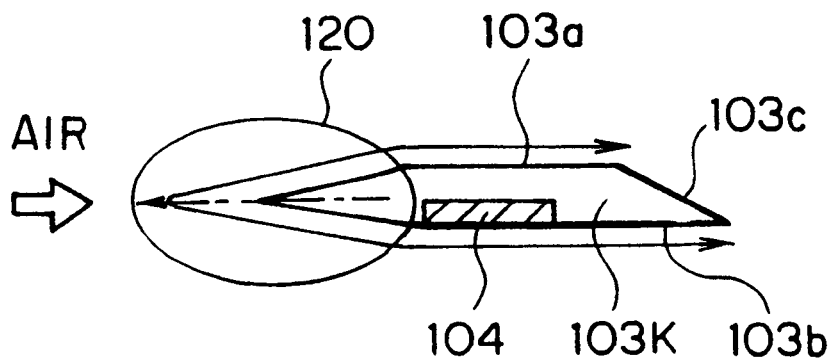
FIG. 20 is a sectional view which is similar to that of FIG. 5 and which shows a flow rate detecting section in accordance with an eleventh embodiment of the present invention.

FIG. 20 shows a thermosensitive flow rate sensor in accordance with an eleventh embodiment of the present invention; it is the same sectional view as that of FIG. 5. The eleventh embodiment has the same construction as the first embodiment except for a support member 103K.

In the eleventh embodiment, a distal end portion 120 on the upstream side of the support member 103K is shaped into a pointed configuration. The pointed distal end enables the accumulation of dust onto the distal end portion 120 of the support member 103K to be restrained even if suspended dust that has passed through an air cleaner element in an air cleaner enters the main pipe 100. Since the accumulation of dust onto the distal end portion 120 of the support member 103K is controlled, a change in a flow around the flow rate detection element 104 over time can be effectively restrained.

Twelfth Embodiment

Figure 21:
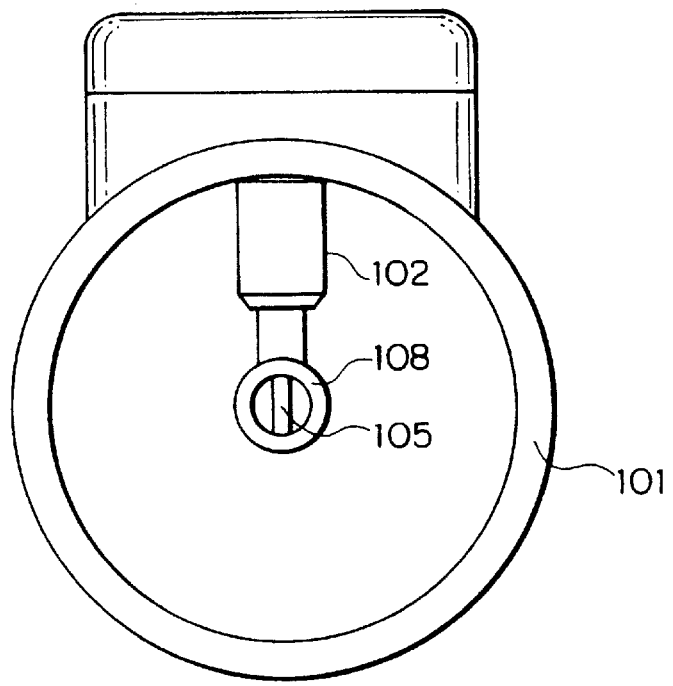
FIG. 21 is a view showing a thermosensitive flow rate sensor, as observed from the upstream side, in accordance with a twelfth embodiment of the present invention.
Figure 22:
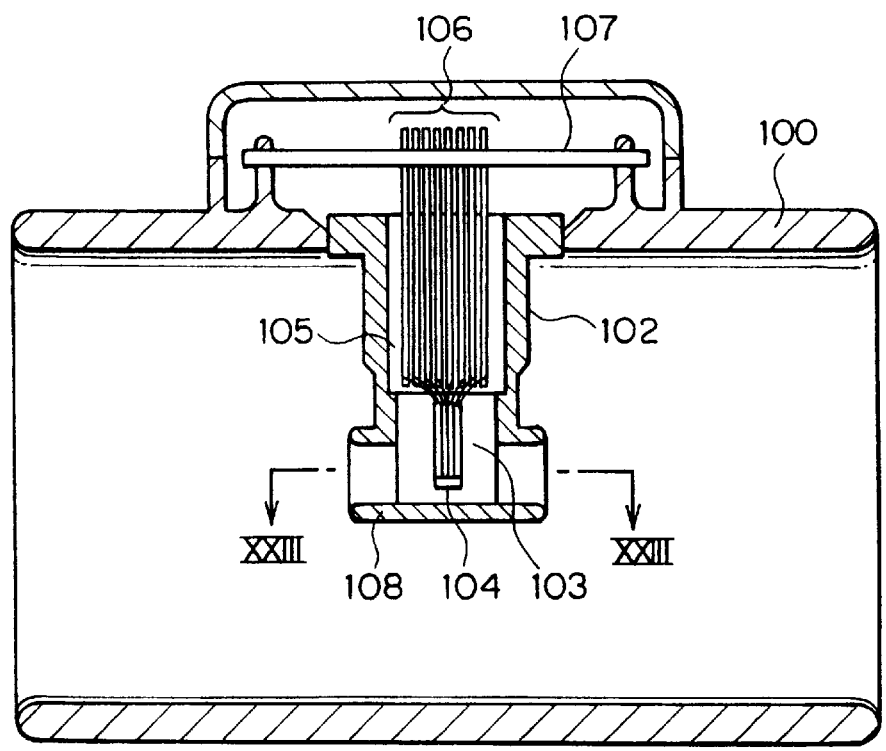
FIG. 22 is a sectional view of the thermosensitive flow rate sensor of the twelfth embodiment of the present invention.
Figure 23:
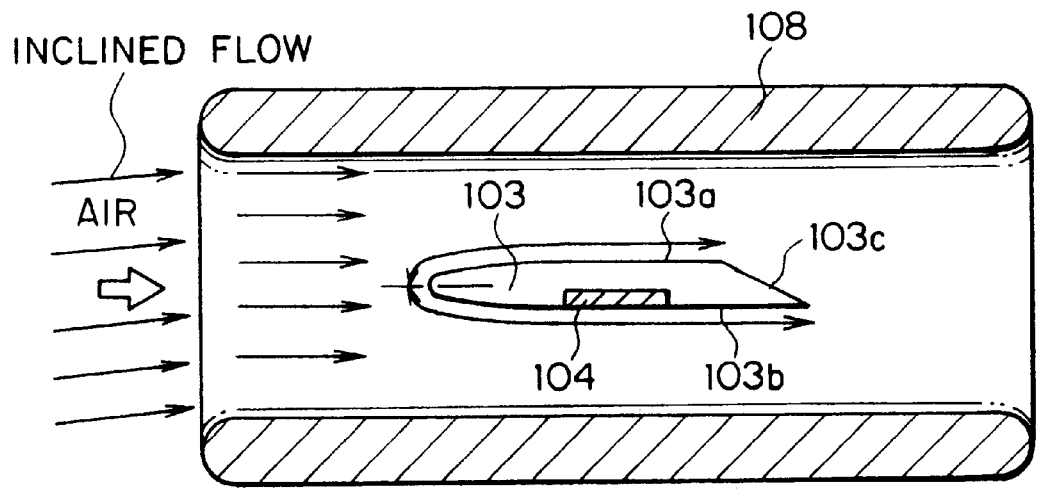
FIG. 23 is a sectional view taken on line XXIII—XXIII of FIG. 22.
Figure 24:
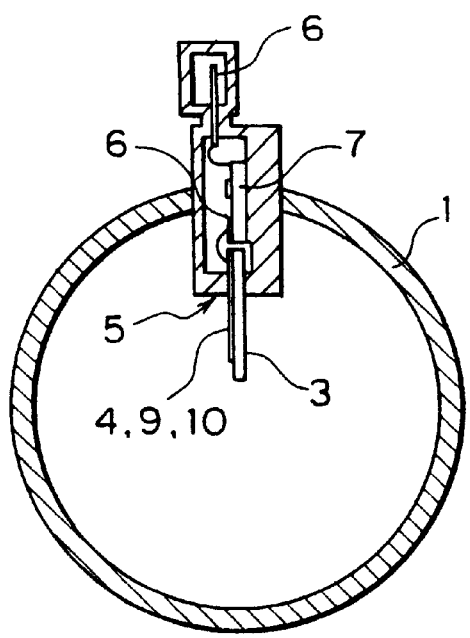
FIG. 24 is a view of a conventional thermosensitive flow rate sensor observed from the upstream side.

FIG. 21 is a schematic diagram of a thermosensitive flow rate sensor in accordance with a twelfth embodiment of the present invention, the view being observed from the upstream side; FIG. 22 is a sectional view of FIG. 21; and FIG. 23 is a sectional view taken at line XXIII—XXIII of FIG. 22. In the twelfth embodiment, an annular measuring pipe 108 is retained on a support 102 in a main pipe 100, and a part of a support member 103 equipped with a flow rate detection element 104 is disposed in the measuring pipe 108, the support member 103 sharing the same construction as that of the first embodiment. An air flow sucked into the main pipe 100 is rectified to unify the direction of flow thereof when passing through the measuring pipe 108, so that a flow around the flow rate detection element 104 can be stabilized.

In the first through twelfth embodiments set forth above, the downstream-side end surfaces (103c through 103h) formed by extending the second guide surface 103b of the support member 103, to which the flow rate detection element 104 is attached, longer toward the downstream side than the first guide surface 103a constitute the restraining portions for controlling the occurrence of a vortex in accordance with the invention. The restraining portions, however, are not limited to those described in the above embodiments; they may have any other constructions or shapes as long as they provide a function to restrain or prevent the occurrence of the vortex at the downstream end of the support member 103.

The present invention constituted as set forth above provides the following outstanding advantages.

Even when a thermosensitive flow rate sensor is installed in an internal-combustion engine or the like with large intake air pulsation, the occurrence of a vortex on the surface of a flow rate detection element can be restrained; therefore, errors in the measurement of the intake air flow rate can be reduced.

The velocity boundary layer, developing from a second guide surface on which the flow rate detection element is mounted, can be made thinner so that the heat transfer from the flow rate detection element to a fluid can be improved, ensuring higher sensitivity and a stable output of the flow rate detection element even when the flow rate changes.

The downstream-side end surface of the support member of the flow rate detecting section is formed into a convex shape or the joint of the downstream-side end surface and the second guide surface is rounded to make it possible to guide the flow of a fluid along the second guide surface even when a reverse flow occurs. This ensures accurate detection of the flow rate.

The flow rate detection element is installed substantially parallel to the central axis of the main pipe extending in the direction of flow of a fluid therein, whereby the accumulation of contaminants such as dust on the flow rate detection element can be restrained. This provides high accuracy of flow rate detection.

The installation of the flow rate detection element in the acceleration area of the second guide surface of the support member makes it possible to restrain the detachment or separation of intake air, ensuring highly accurate detection of the flow rate thereof.

The upstream side of the support member in the flow rate detecting section is streamline-shaped to achieve reduced pressure loss at the upstream and downstream of the thermosensitive flow rate sensor.

The upstream side of the support member in the flow rate detecting section is symmetrically shaped, so that the directivity of a flow depending on the inflow condition of intake air (i.e., the tendency in which introduced air is apt to flow more easily along one of the guide surfaces of the support member than the other) can be reduced, thus ensuring highly accurate detection of the flow rate.

The upstream-side distal end of the support member in the flow rate detection element is pointed to restrain the accumulation of dust onto the distal end of the support member, making it possible to restrain the deterioration in the accuracy of flow rate detection over time.

The measuring pipe is installed substantially parallel to the direction of flow of air in the main pipe, and the flow rate detection section is provided in the measuring pipe. Such arrangements serves to rectify the direction of flow in the measuring pipe, providing highly accurate flow rate detection.

What is claimed is:

1. A thermosensitive flow rate sensor for measuring the flow rate of a fluid passing through a main pipe based on a heat transfer to said fluid from a heating element of a flow rate detecting means installed in said main pipe, said flow rate detecting means comprising:

a support member having first and second guide surfaces formed on opposite sides thereof for guiding said fluid therealong; and a flow rate detection element provided on said second guide surface of said support member;

wherein said second guide surface of said support member is longer than said first guide surface in a downstream direction;

said second guide surface of said support member has an acceleration area disposed at a predetermined angle with respect to a central axis of said main pipe extending in the direction of flow of said fluid therein and a surface disposed substantially in parallel to the central axis of said main pipe on the downstream side of said acceleration area, said flow rate detection element being embedded in said acceleration area so as to form a smooth fluid-guiding surface; and said acceleration area formed on said second guide surface of said support member is a surface inclined at approximately ten degrees or less with respect to the central axis of said main pipe.

2. A thermosensitive flow rate sensor according to claim 1, wherein said support member has a downstream-side end surface at which said first and second guide surfaces join to each other, said downstream-side end surface being formed to have a concave surface.

3. A thermosensitive flow rate sensor according to claim 1, wherein said support member has a downstream-side end surface at which said first and second guide surfaces join to each other, said downstream-side end surface being formed to have a convex surface.

4. A thermosensitive flow rate sensor according to claim 1, wherein said second guide surface of said support member has a downstream-side end portion provided with a concave slope.

5. A thermosensitive flow rate sensor according to claim 1, wherein a portion at which said first and second guide surfaces and said downstream-side end surface of said support member join to each other are round.

6. A thermosensitive flow rate sensor according to claim 1, wherein said flow rate detection element is in the form of a plate which is installed on said second guide surface of said support member so that it is substantially parallel to a central axis of said main pipe extending in the direction of flow of said fluid therein.

7. A thermosensitive flow rate sensor according to claim 1, wherein said acceleration area of said second guide surface is a flat surface or a convex surface.

8. A thermosensitive flow rate sensor according to claim 1, wherein an upstream portion of said support member has a streamline shape.

9. A thermosensitive flow rate sensor according to claim 1, wherein said support member has an upstream portion formed to be symmetrical with respect to the central axis of said main pipe.

10. A thermosensitive flow rate sensor according to claim 1, wherein said support member has an upstream-side distal end formed in a pointed manner.

11. A thermosensitive flow rate sensor according to claim 1, wherein a measuring pipe is installed in said main pipe substantially in parallel to the direction of flow of said fluid, and said flow rate detecting means is disposed in said measuring pipe.

12. A thermosensitive flow rate sensor for measuring the flow rate of a fluid passing through a main pipe based on a heat transfer to said fluid form a heating element of a flow rate detecting means installed in said main pipe, said flow rate detecting means comprising;

a support member having a guide surface for guiding said fluid therealong, a flow rate detection element provided on said guide surface of said support member for detecting the flow rate of said fluid; and a restraining portion provided on a downstream side of said support member for restraining occurrence of a vortex, wherein said guide surface of said support member has an acceleration area disposed at a predetermined angle with respect to a central axis of said main pipe extending in the direction of flow of said fluid therein and a surface disposed substantially in parallel to the central axis of said main pipe on the downstream side of said acceleration area, said flow rate detection element being embedded in said acceleration area so as to form a smooth fluid-guiding surface; and said acceleration area formed on said guide surface of said support member is a surface inclined at approximately ten degrees or less with respect to the central axis of said main pipe.

* * * * *